United States Patent [19]

Ichiugi

[11] 4,123,784
[45] Oct. 31, 1978

[54] SELECTABLE FRACTION OF REVOLUTION TAPE RECORDER

[76] Inventor: Isamu Ichiugi, 4-16 1 chome Denechofu, Otaku, Tokyo, Japan

[21] Appl. No.: 763,901

[22] Filed: Jan. 31, 1977

[51] Int. Cl.² .................. G11B 25/02; G11B 19/02; G11B 5/76

[52] U.S. Cl. .................................. 360/100; 360/12; 360/136

[58] Field of Search ............... 360/100, 136, 12, 87; 346/138

[56] References Cited

U.S. PATENT DOCUMENTS

| | | | |
|---|---|---|---|
| 2,668,718 | 2/1954 | Roberts | 360/136 |
| 2,734,033 | 2/1956 | Menard | 360/136 |
| 2,862,845 | 2/1958 | Szeguari | 360/136 |
| 2,869,966 | 1/1959 | Cunningham | 360/136 |
| 3,409,745 | 11/1968 | Kock | 360/12 |
| 3,576,953 | 5/1971 | Hauer | 360/100 |

Primary Examiner—Alfred H. Eddleman
Attorney, Agent, or Firm—Donald D. Mon

[57] ABSTRACT

A selectable-fraction of revolution tape recorder for reproducing short recorded sounds such as brief words or greetings like "thank you". The recorded sound is recorded in a magnetic sound recording tape or material provided on an outside peripheral surface of a cylindrical part which extends downwardly from the edge of a rotating disc. A pair of switches is provided, one of which is responsive to means carried by the disc and the other of which is physically actuable whereby to initiate and for a predetermined period of time to continue the rotation of the disc. A plurality of switching paths is provided on the disc with recesses extending for different fractional portions of the perimeter of the respective switching path so that appropriate fractions of a revolution of the tape recorder can be selected by selecting an appropriate switching path.

5 Claims, 3 Drawing Figures

SELECTABLE FRACTION OF REVOLUTION TAPE RECORDER

This invention relates to a selectable-fraction-of-revolution tape recorder for reproducing short words and messages.

It is potentially useful to provide a tape recorder for reproducing short messages such as "thank you", or simple directions which can be used at the door of a shop, an automat, a bus stop, or a station.

Tape recorders have been known for reproducing short predetermined words and messages and which include magnetic sound recording tape or material on the inner surface of a cylindrical part and also a capstan for driving the cylindrical part. The capstan always remains in contact with the outer cylindrical part.

Such a device has two serious drawbacks. First it is inconvenient to change the cylindrical part because the capstan is always in contact with it. Furthermore, the capstan which should by definition be made of soft and resilient material such as rubber tends to deform by normal contact with the cylindrical part. Secondly, complicated switch mechanisms are required for adjusting the reproducing cycle.

It is an object of this invention to provide a tape recorder which eliminates the above drawbacks, in which it is possible to change the cylindrical part easily, and in which the capstan and head do not have to remain in constant contact with the cylindrical part in the pause condition.

Still another object of the invention is to provide a tape recorder which has a simple switch mechanism whereby the reproducing cycle can readily be selected.

A selectable-fraction-of-revolution tape recorder according to this invention comprises a base which mounts a rotatable disc which carries a vertical cylindrical portion with an inside and an outside surface. These surfaces extend downwardly from the disc and are concentric with it. The disc includes a plurality of switching paths arranged circularly and concentrically, each including a recessed portion which extends for a fraction of the perimeter of its respective paths, the fractions of the paths being different from one another. A peripheral band or magnetic sound recording tape is provided on the outside of the cylindrical portion. A magnetic head for reproducing the sound recorded on the tape is provided adjacent thereto, and it is supported for movement toward and away from reproducing proximity to the band. A drive motor is provided together with a capstan. The capstan is slidably mounted so as to move toward and away from driving contact with the inside surface and with the said motor. Means is provided to move the head and the capstan toward and away from driving contact. First switch means is mounted to the base adjacent to the switching paths and is movable from path to path. Normally-open second switch means is connected in parallel with the first switch means which can physically be closed. The two switch means are parallel connected, physically be closed. The two switch means are parallel connected, and as a unit are connected in series with a source of electricity. Closure of the second switch means starts operation of the motor, which continues as long as either one or both of the switch means is closed. The duration of closure of the first switch means is determined by the angular subtense of the switching track to which the first switch means is adjacent.

The invention will be fully understood from the following detailed description and the accompanying drawings in which.

Figure 1:
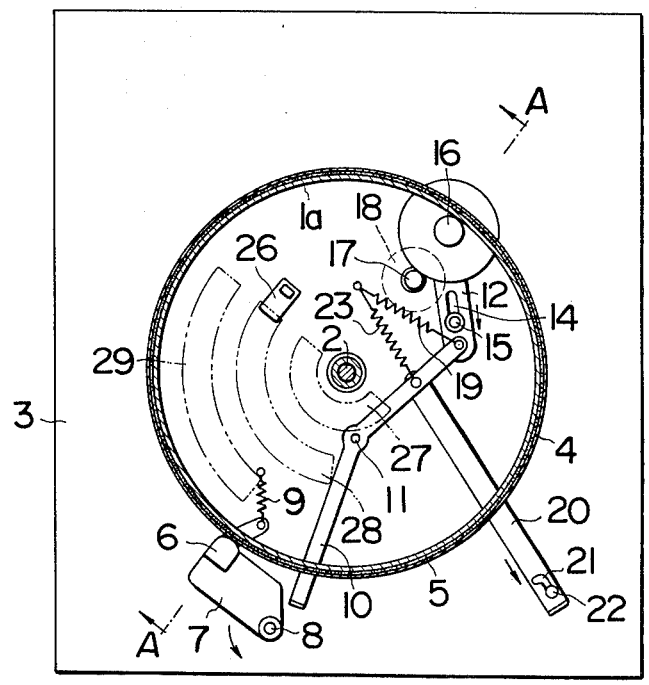
FIG. 1 is a plan view of an embodiment of the present invention eliminating a disc for ease of illustration.
Figure 2:
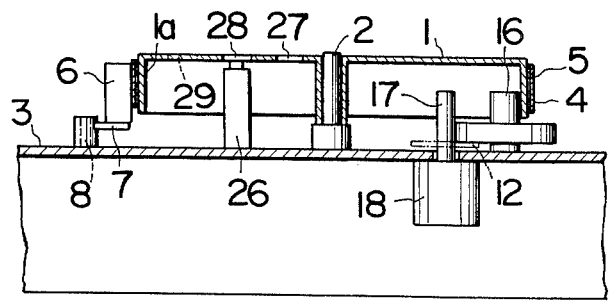
FIG. 2 is a cross-section taken at line A—A in FIG. 1.

A disc 1 is rotatable on a round vertical axis 2 and is supported by base 3. The rotatable disc has a vertical cylindrical portion 1a which extends from the edge of the disc downwardly and has an inside surface and an outside surface.

A magnetic sound recording tape 4 is wrapped around the outside surface and there is interposed between them a layer of soft resilient material 5.

A magnetic head 6 for reproducing recorded sound from tape 4 is mounted to a pivotable table 7 which is pivoted around axis 8 and mounted on base 3. It is biased by bias means (spring) 9 so as to tned to bring the head in sound reproducing contiguity with tape 4.

A bent lever 10 is rotatably mounted on shaft 11 to base 3. One end of lever 10 extends toward table 7 where it is contactable therewith. The other end of lever 10 is connected to a slideplate 12 by pin 13. Slideplate 12 has a slot 14 in which a guide pin 15 (mounted to base 3) engages so as to slide the slideplate 12 as guided by slot 14 and pin 15. A capstan 16 is mounted to slideplate 12 and is movable by the slideplate to a position in driving contiguity with the inside surface of the cylindrical portion 1a or to be moved away from it. It is also movable toward and away from a drive shaft 17 of motor 18 so that when it is in driving relationship with the inside surface it is also in driven relationship with motor 18. It can be pulled out of this condition by clockwise rotation of the lever which also causes abutment of the other end of the lever with table 7 to move the recording head out of proximity with the tape. A hand operating lever 20 is connected to lever 10. It includes an L-shaped slot 21. A hook 22 is mounted to the base and can be used to hold the hand operating member in a withdrawn position if desired.

Figure 3:
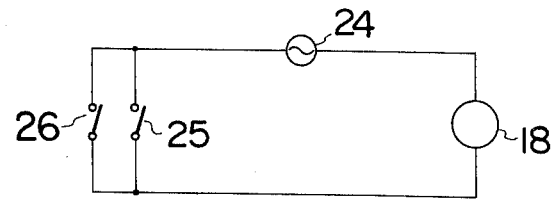
FIG. 3 shows a circuit useful in this invention.

As shown in FIG. 3, motor 18 is connected to an electric source 24 and a first switch 26 is connected in parallel relationship with a second normally opened switch 25. Second switch 25 is normally open and can be physically contacted such as by a finger or operator so as to start operation of the device. Switch 26 is mounted to the base and is radially movable relative to the vertical axis 2. In the bottom surface of the disc there is provided a plurality of switching paths 27, 28 and 29 each of which occupies a different fraction of the perimeter of the respective switching path. They are all concentric around axis 2. First switch 26 is mounted to the base and is contactable with the underside of the disc at the selected switching path. Each path includes a respective cut out recess, which is arcuate. When the switch is contiguous to a recess it has one switching condition, and when it is contiguous to the under surface of the disc it has another switching condition. It is evident that first switch 26 will remain in one condition so long as it lies within the angular extent of the recess of one of the switching paths and a different one when it is not.

As can be seen from the foregoing, if it is not desired for the device to operate or drive, lever 10 is rotated clockwise so as to move the heat out of contact with the tape and the capstan out of contact with the inside surface. It can be held in this position by engaging the hook 22 in slot 21. When the device is to be driven the hook is released in the slot and the bias springs including bias springs 19 and 23 will pull the head and the capstan into operating positions. Then assuming the condition existent in FIG. 1 and that the device is stopped, normally-open second switch 25 will be closed which will commence the operation of the motor. It will be held closed to drive the disc until first switch 26 enters a respective recess thereby closing the circuit through switch 26. Now switch 25 can be permitted to open and the device will still drive and the message be delivered until the selected fraction of rotation has occurred at which time the switch 26 will again be opened. Then operation will stop. When the operation is to be resumed, switch 25 will be held until switch 26 again reaches one of the recesses and the message is delivered. Switches 25 and 26 are in parallel connection, and as a unit, are in series with the source of electricity.

What is claimed is:

1. A tape recorder comprising:

a base;

a rotatable disc rotatably mounted to said base around a vertical axis, said disc including a vertical cylindrical portion having an inside and an outside surface extending downward from said disc, and being concentric therewith, said disc including a plurality of switching paths arranged circularly and concentrically, each including a recessed portion which extends for a fraction of the perimeter of its respective path, the fractions of the paths being different from one another;

a peripheral band of magnetic sound recording tape on the outside of said cylindrical portion;

a magnetic head for reproducing sound recorded on said tape;

a rotatable table mounted to said base and supporting said head for movement toward and away from reproducing proximity to said tape band;

a drive motor mounted to said base;

a capstan;

a slideplate slidably mounted to said base and mounting said capstan for movement toward and away from driving contact with said inside surface and with said motor;

a lever pivotally mounted to said base and so disposed and arranged relative to said table and said slideplate that it has a first setting which enables the head to move to a sound reproducing position and the capstan to move to a driving position, and a second setting in which they are removed from said positions;

first switch means mounted to said base adjacent to said switching paths and being movable from path to path, said switch means having a first and a second switching condition, one of which is closed and the other of which is open, the switching condition being determined by whether the switch means is adjacent to a recessed or non-recessed part of a respective switching path;

normally-open second switch means in parallel connection with said first switch means which can physically be closed;

and connection means in series connection with said parallel-connected switch adapted to be connected to a source of electricity;

whereby closure of said second switch means starts operation of the motor, which continues so long as one of the switching means is closed, the duration of closure of the first switch means being determined by the angular subtense of the recessed or non-recessed part of the switching track to which the first switch means is adjacent.

2. Apparatus according to claim 1 in which the disc includes a flat annular surface in its underside, said switching paths being formed in said annular surface, said recessed portions extending arcuately.

3. Apparatus according to claim 1 in which a hand-operating lever is connected to move said lever to its second setting, and in which spring bias means bias the table toward the disc, and the capstan toward the said inside surface.

4. Apparatus according to claim 3 in which the disc includes a flat annular surface in its underside, said switching paths being formed in said annular surface, said recessed portions extending arcuately.

5. Apparatus according to claim 1 in which soft resilient material is interposed between said outside surface and said tape.

* * * * *